(12) United States Patent
Goff et al.

(10) Patent No.: US 10,900,284 B2
(45) Date of Patent: Jan. 26, 2021

(54) DOWNHOLE MOTOR BEARING PACK

(71) Applicant: Hawg Tools LLC, Brighton, CO (US)

(72) Inventors: Gregory Clarence Goff, Bar Nunn, WY (US); Patrick Daniel Gallagher, Mills, WY (US); Daniel Robert Gallagher, Casper, WY (US)

(73) Assignee: New Ventures Marketing, LLC, Brighton, CO (US)

( * ) Notice: Subject to any disclaimer, the term of this patent is extended or adjusted under 35 U.S.C. 154(b) by 207 days.

(21) Appl. No.: 16/201,145

(22) Filed: Nov. 27, 2018

(65) Prior Publication Data

US 2020/0165872 A1 May 28, 2020

(51) Int. Cl.
*E21B 4/00* (2006.01)
*F16C 19/10* (2006.01)
*F16C 33/66* (2006.01)
*E21B 4/02* (2006.01)

(52) U.S. Cl.
CPC .............. *E21B 4/003* (2013.01); *F16C 19/10* (2013.01); *F16C 33/664* (2013.01); *F16C 33/6637* (2013.01); *E21B 4/02* (2013.01); *F16C 2352/00* (2013.01)

(58) Field of Classification Search
CPC .................................. E21B 4/02; E21B 4/003
See application file for complete search history.

(56) References Cited

U.S. PATENT DOCUMENTS

| 6,250,806 | B1 | 6/2001 | Beshoory | |
|---|---|---|---|---|
| 2010/0326730 | A1* | 12/2010 | Prill | E21B 4/003 175/57 |

* cited by examiner

*Primary Examiner* — Kristyn A Hall
(74) *Attorney, Agent, or Firm* — James A. Sheridan; Sheridan Law, LLC

(57) ABSTRACT

A rotatable bearing assembly transfers a weight of a drill string to a mud motor output shaft extending therethrough. The bearing assembly includes an outer bearing housing, an upper radial bearing assembly providing an upper radial bearing between the outer bearing housing and the output shaft, a balance piston that fluidly seals an upper end of the outer bearing housing and balances a pressure within the outer bearing housing, a lower radial bearing/seal assembly configured to both fluidly seal a lower end of the outer bearing housing and provide a lower radial bearing between the outer bearing housing and the output shaft, and a thrust bearing assembly received within the sealed interior of the outer bearing housing such that the bearing assembly initially operates in a sealed, lubricated mode and then a mud lube mode in the event of one or more seal failures. Other embodiments are also disclosed.

20 Claims, 17 Drawing Sheets

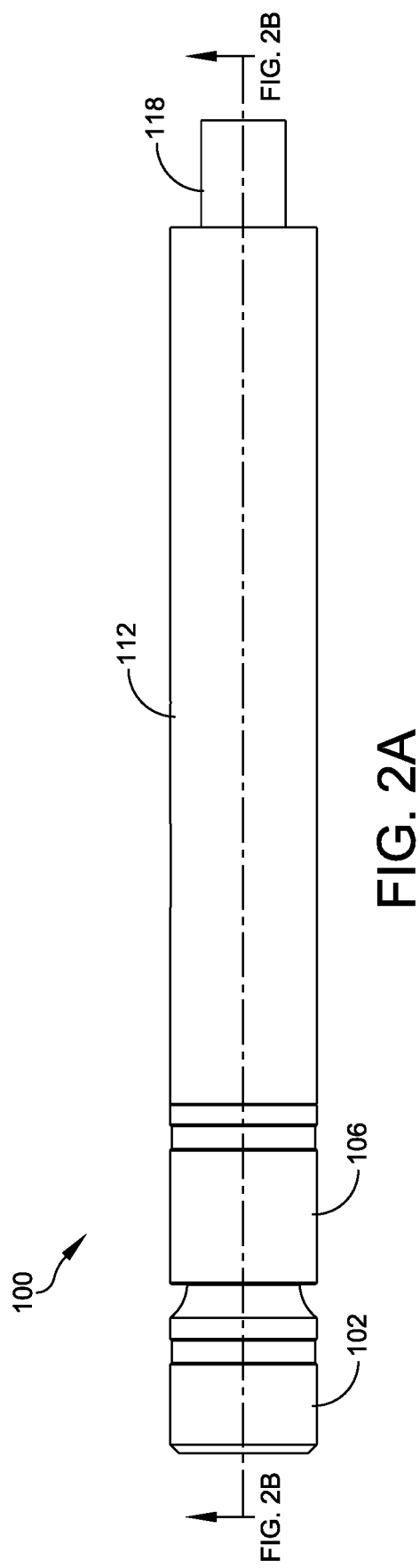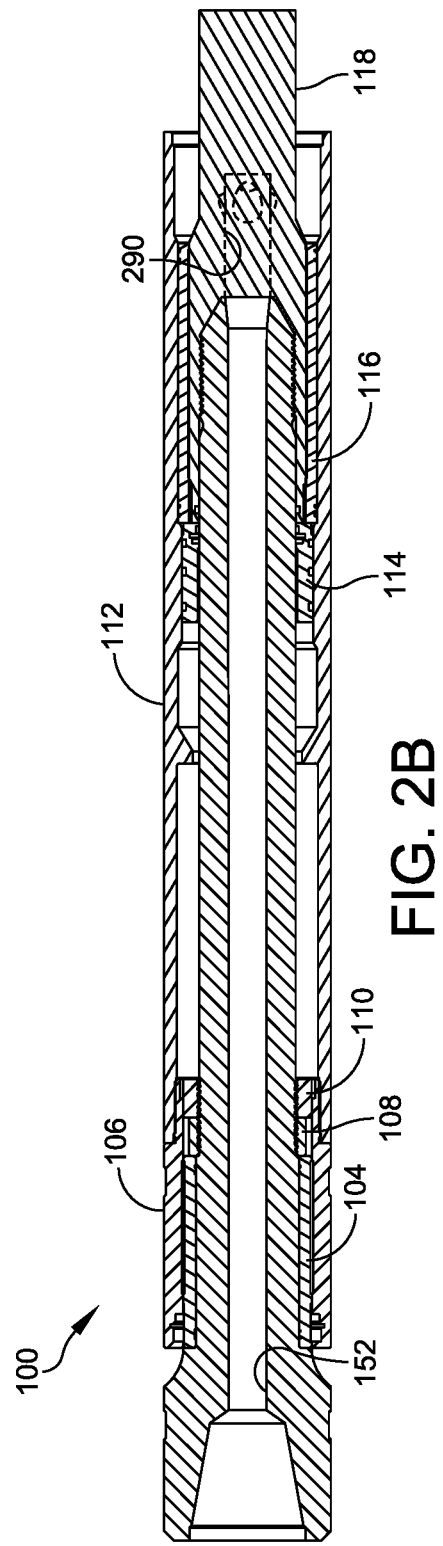

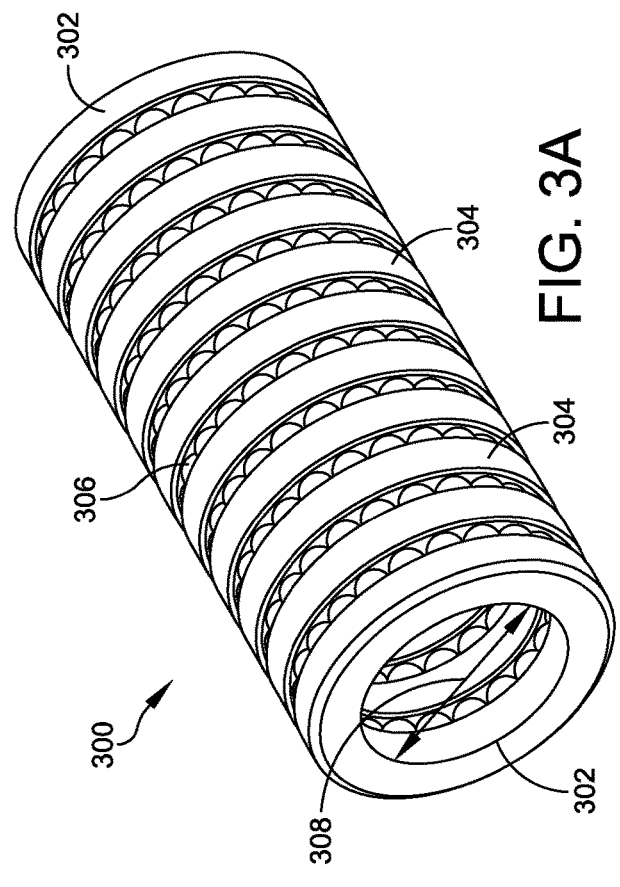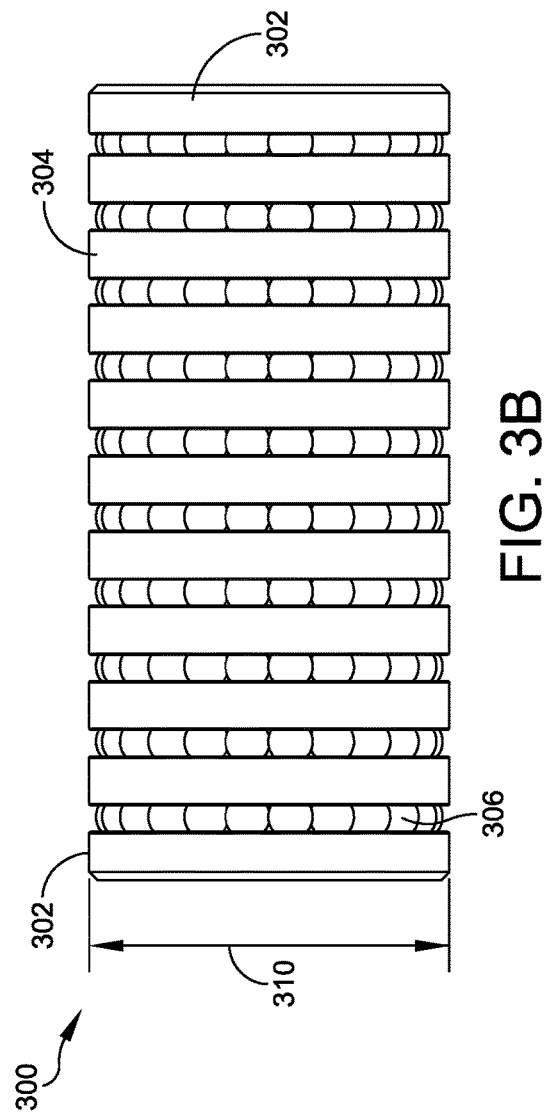
FIG. 3A
FIG. 3B

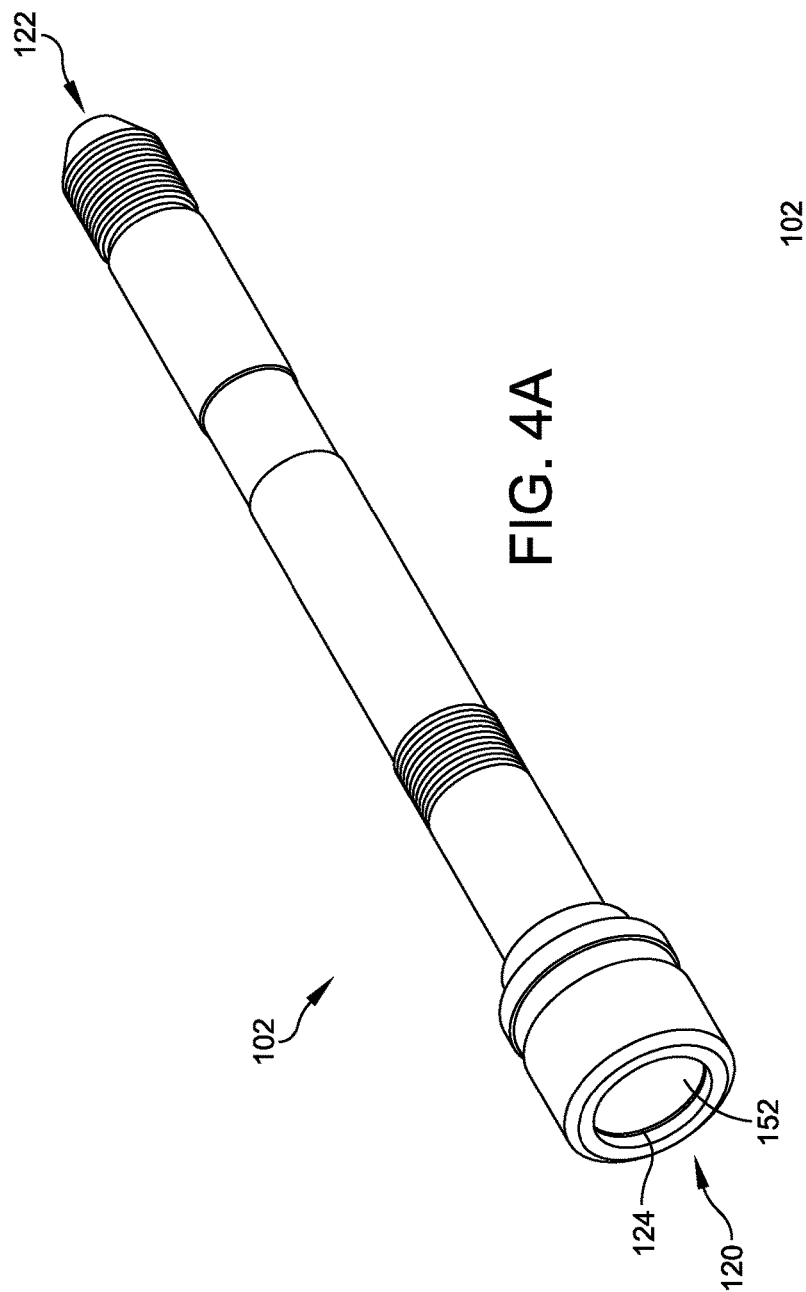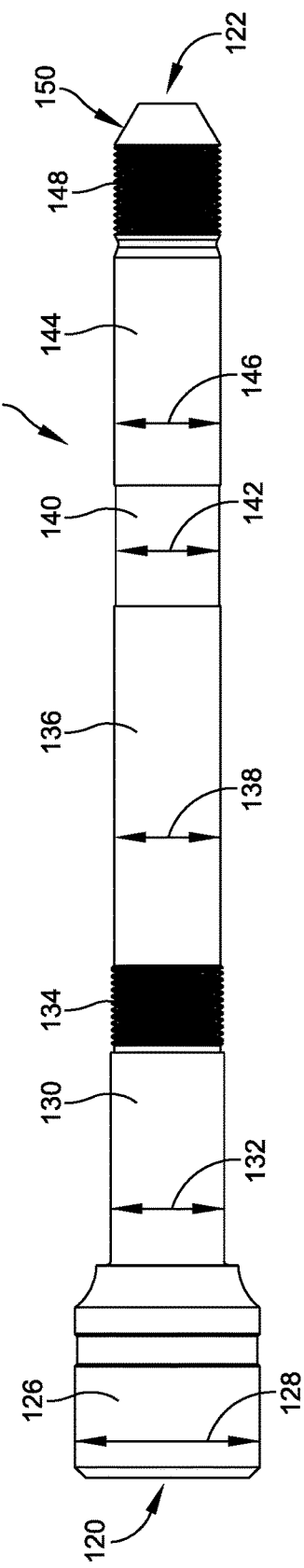

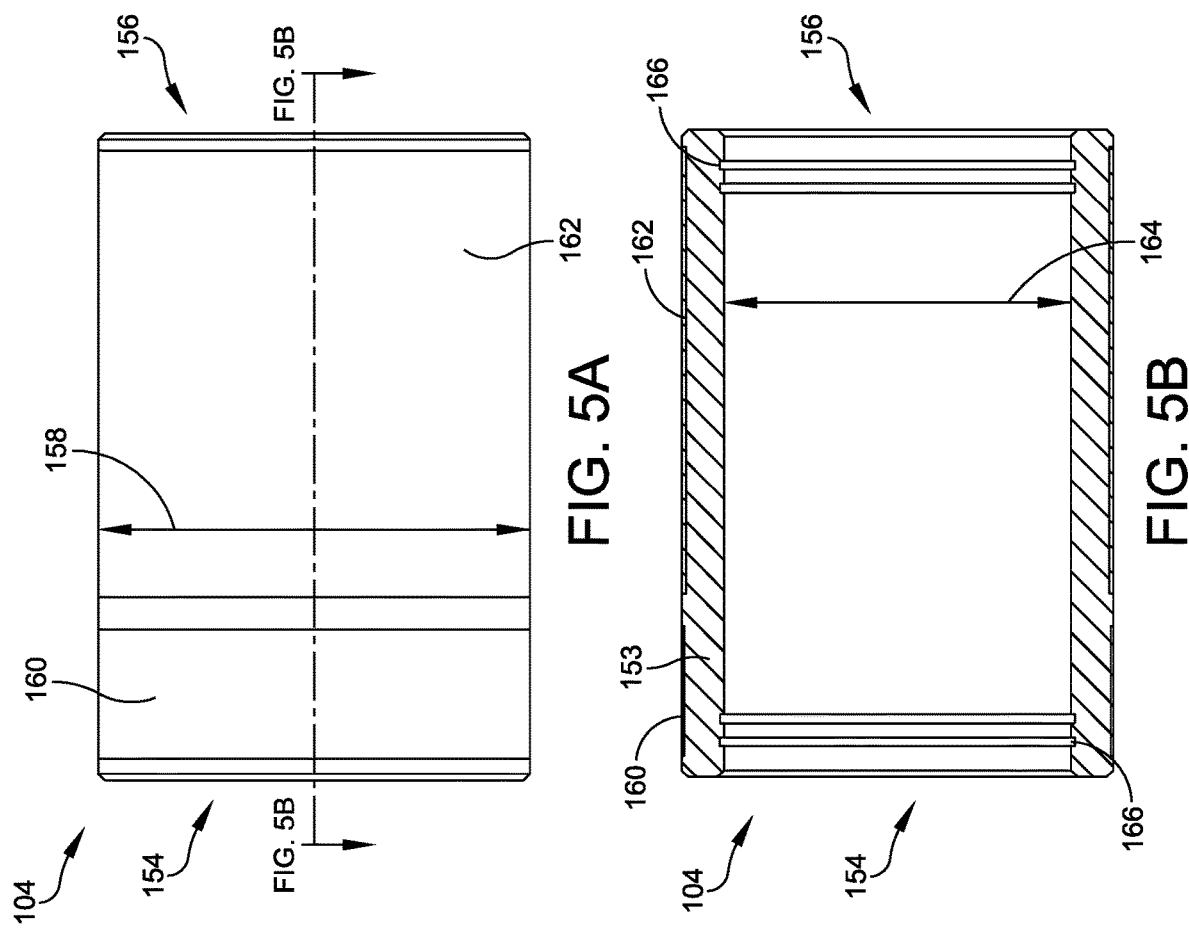

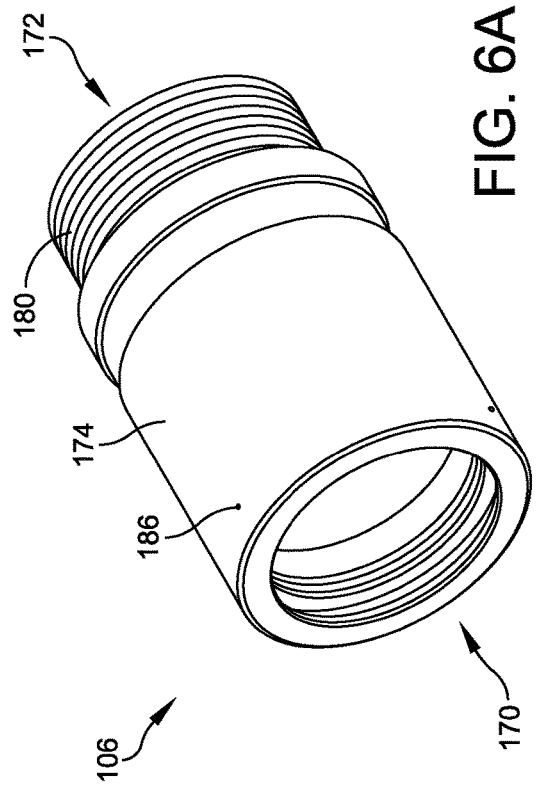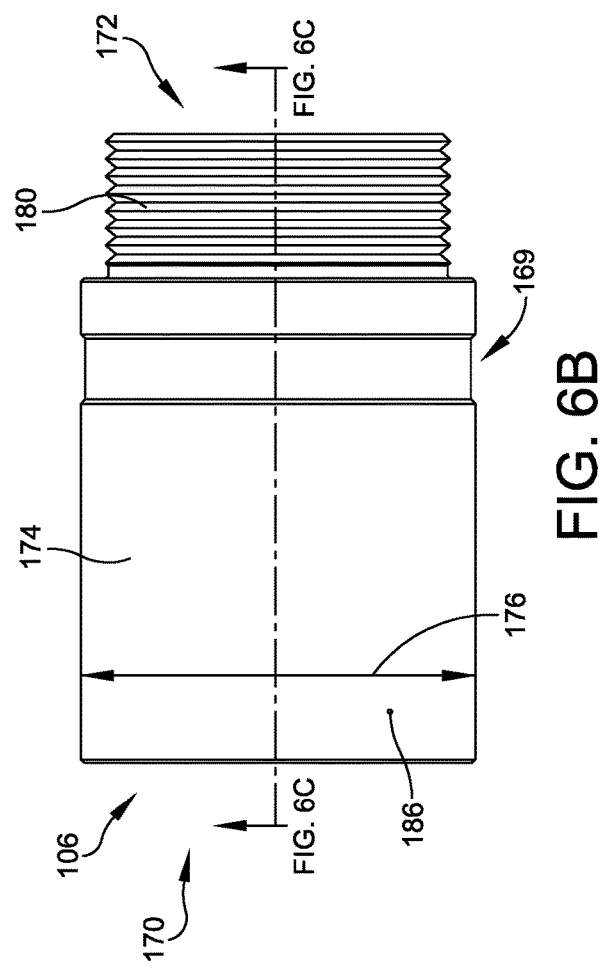

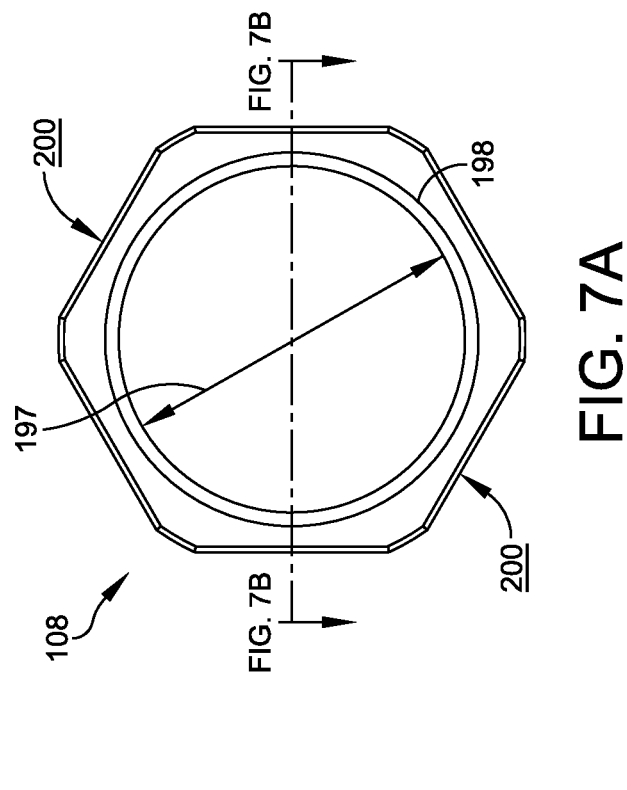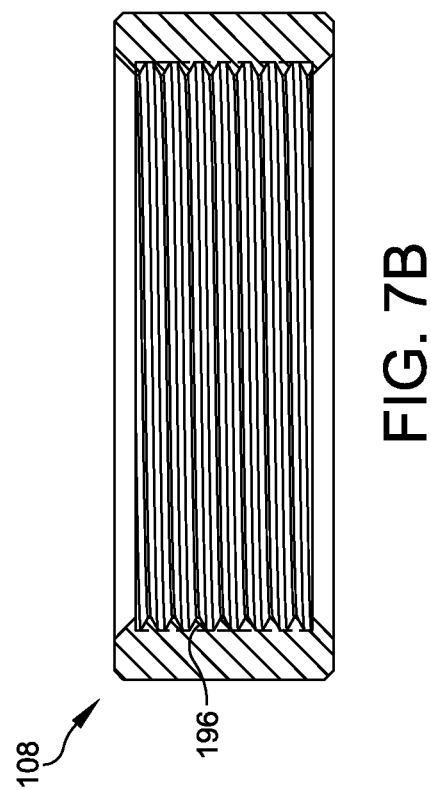
FIG. 7A
FIG. 7B

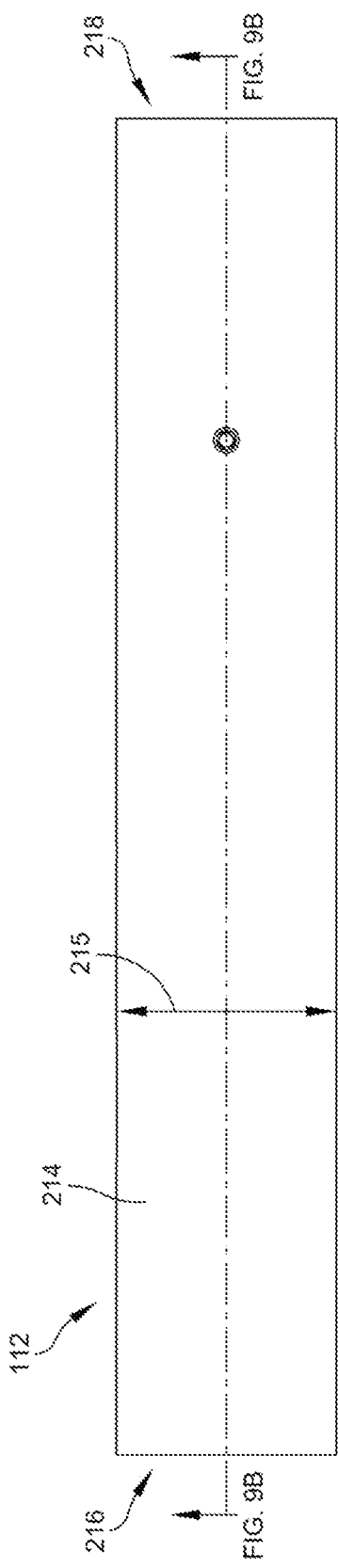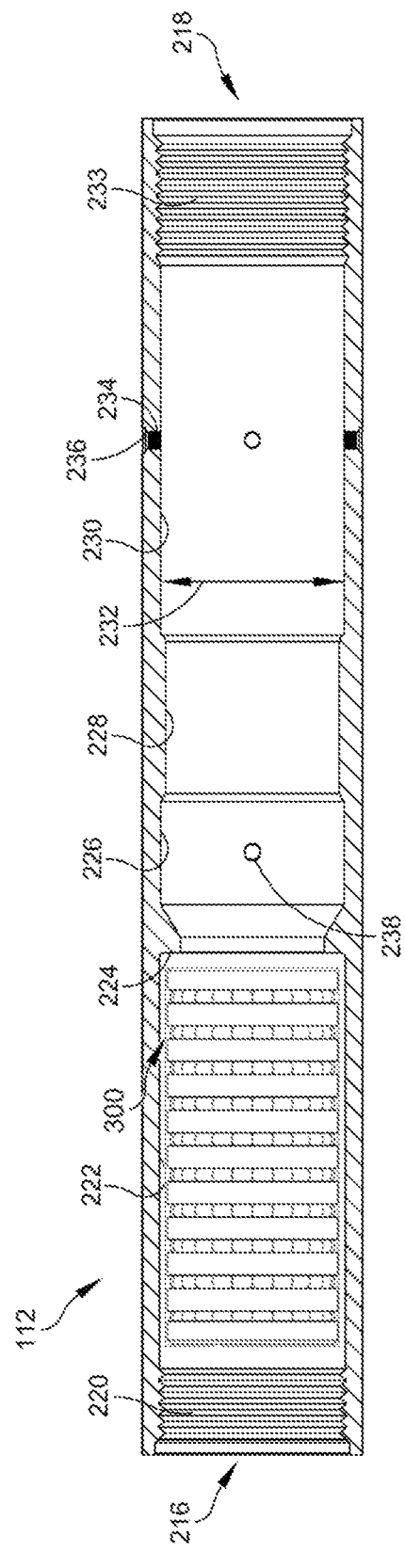

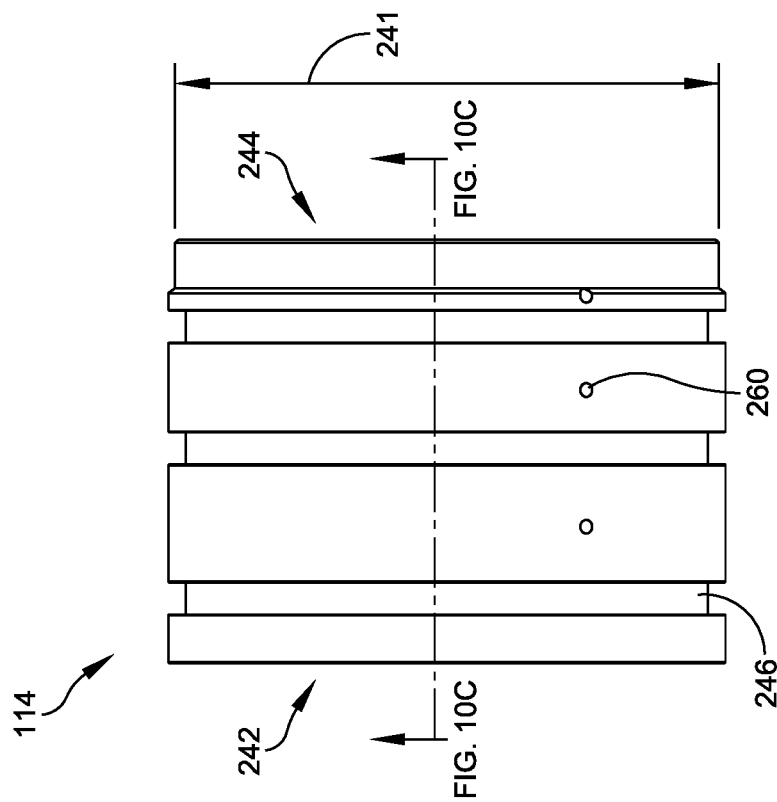
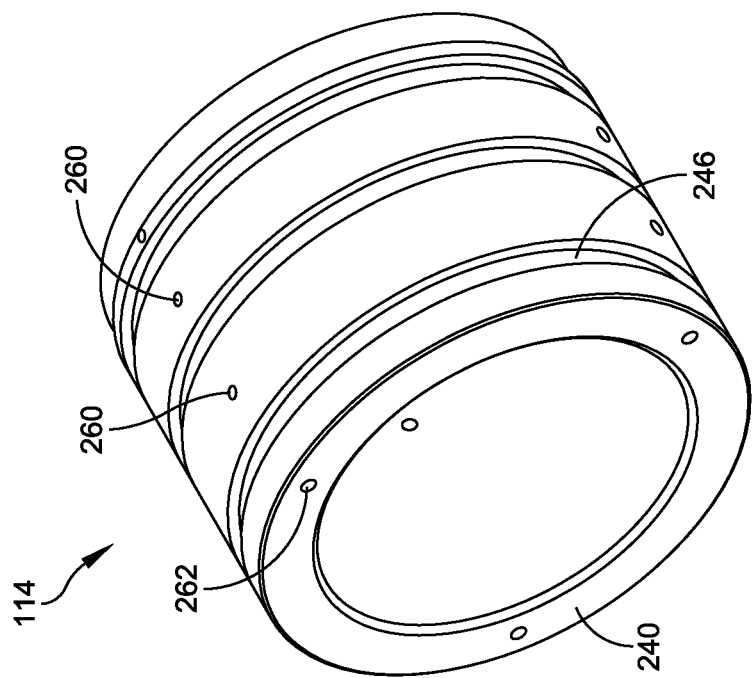

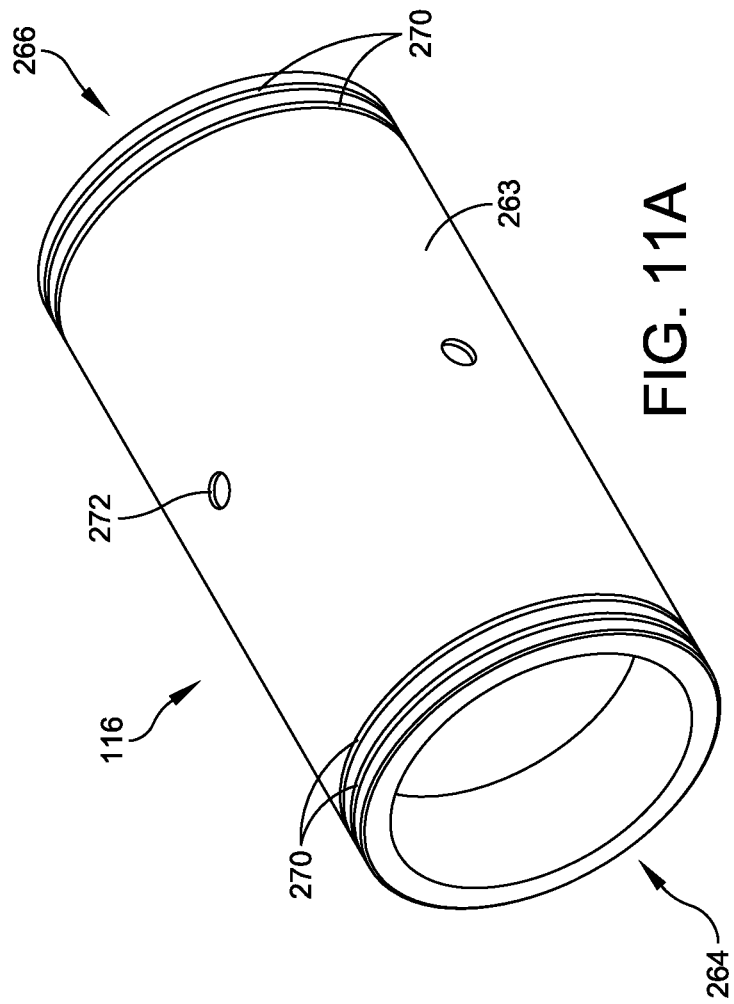
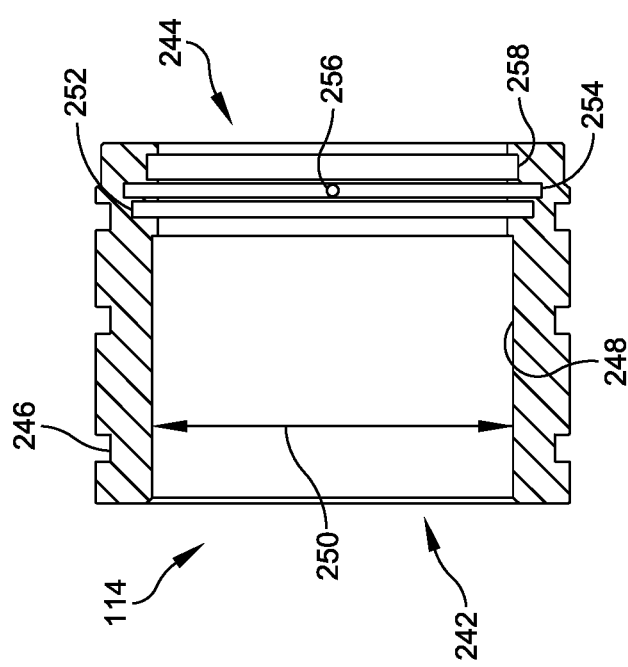

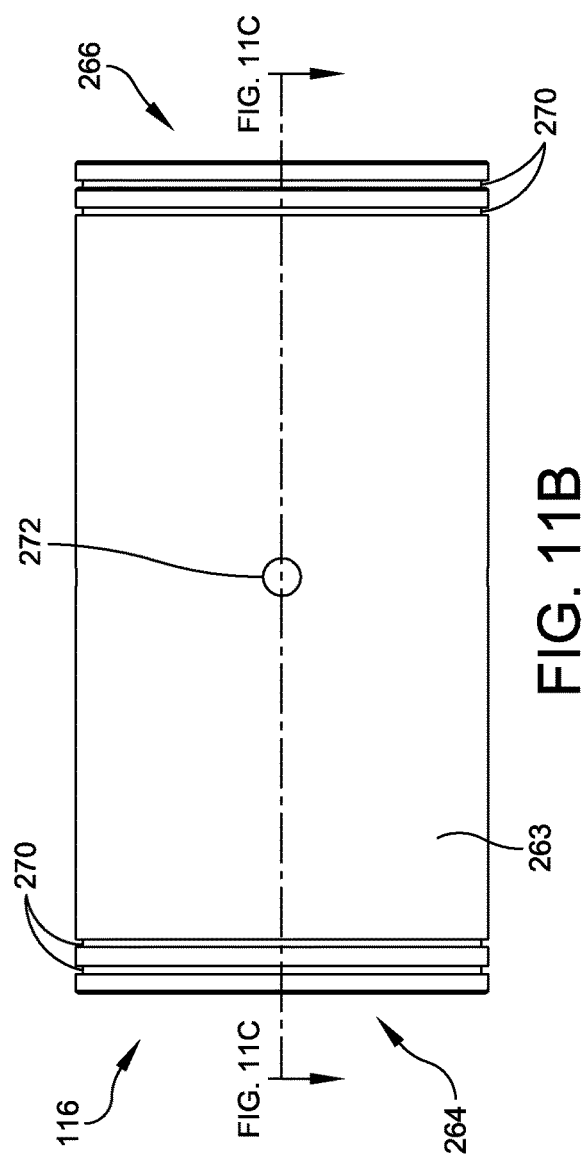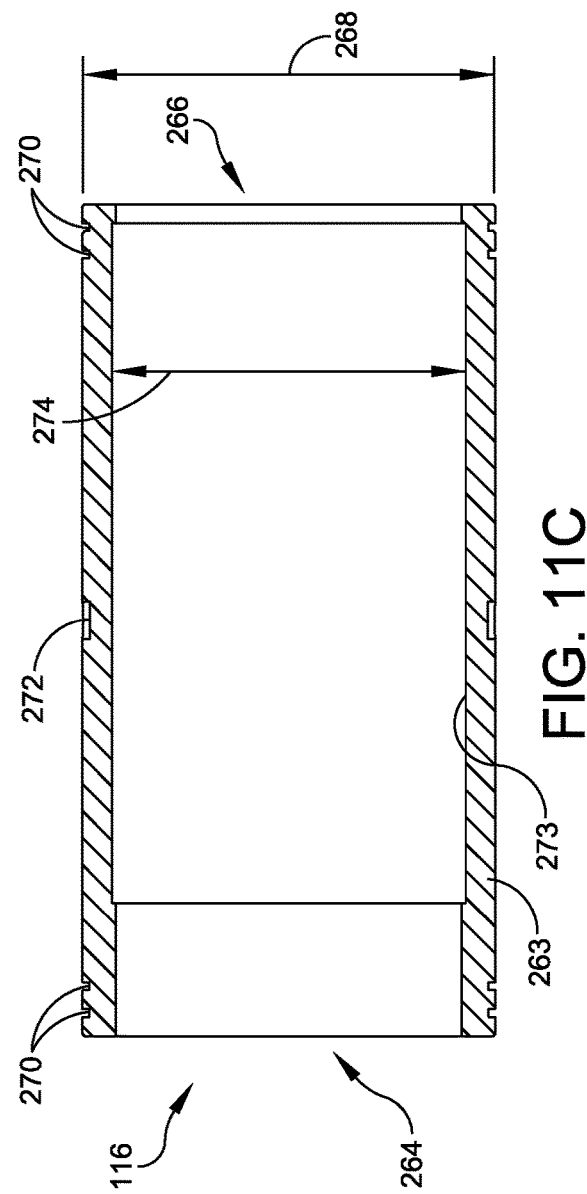

DOWNHOLE MOTOR BEARING PACK

BACKGROUND

In the oil and gas industry, as well as in mining and other industries, holes are often drilled into the earth to reach the desired stratum to evacuate natural resources. To drill deep holes, the practice of using a fluid motor to drive a drill bit has become commonplace. In operation, the fluid motor is installed at the lower end of a drill pipe string and drilling fluid or "mud" is circulated down through the drill string and motor. The drilling mud flowing through the motor causes a mounted output shaft to rotate. A drill bit is secured to the end of the output shaft and, in turn, rotates to cut through the formation or stratum. In this regard, mud motors supplement drilling operations by turning fluid power into mechanical torque and applying this torque to the drill bit. The mud is also used to cool and lubricate the drill bit, carry away drilling debris, and provide a mud cake on the walls of the annulus to prevent the hole from sloughing in upon itself or from caving in all together.

During well drilling operations, the drill bit is forced against the earth's formation by the weight of the drill string. The weight of the drill string is transferred through a rotatable bearing assembly to the hollow output shaft which is attached to the drill bit. A bearing housing, containing the rotatable bearing assembly and through which the output shaft extends, remains relatively stationary. As a result of this drilling method, the rotatable bearing assembly must endure severe vibration, shock, and axial and radial loading.

Typically, fluid motor bearing assemblies include a combination of bearing elements, such as radial bearings and thrust bearings. The rotation of the output shaft within the bearing assembly creates a substantial amount of heat within the individual bearing elements. As a result, the bearing elements must be cooled by some type of lubricant.

Mud motors operating under very high pressure and high torque operations are known to fail in certain, predictable ways. The failure of a mud motor is very expensive, as the whole drill string must be pulled-out of the hole in order to bring the mud motor to the surface where it can be repaired or replaced. This operation is both time consuming and costly. Common problems that occur with prior art mud motors include seal failure resulting in drilling mud entering into the universal joint of the transmission section, pressuring up, or hydraulic locking, due to either fluid or gas becoming trapped within the confines of the tool itself, broken bearing mandrels, and most applicable here, an invasion of drilling mud into the bearing section of the drill string.

There are primarily two types of mud motor bearing packs commonly used in the energy industry. The first is a sealed pack design in which the internal bearing elements, which include caged rollers with hardened races on either side of the rollers, are lubricated by a petroleum-based lubricant and sealed from the wellbore environment by a combination of seals and O-rings, with the upper radial bearings being lubricated by a small diverted quantity of the drilling fluid. While efficient and configured to transfer maximum power to the drill bit, the major drawback to this sealed bearing pack design is that should the seals and/or O-rings fail, the wellbore fluid is able to invade the interior of the bearing pack, where the abrasive wellbore fluid quickly damages the internal bearing components and causes them to fail such that the mud motor must be pulled from the well and replaced in a typically expensive operation.

The second type of bearing pack commonly used in the energy industry is a mud lubricated, or mud lube, bearing pack. The mud lube bearing pack, as indicated by its name, is lubricated entirely by drilling fluid. The mud lube bearing pack contains no seals or O-rings that are vulnerable to failure. Generally, the mud lube bearing pack includes a lower male radial bearing constructed of a metal inner shell having a brazed carbide cloth coating that has been ground to a specified outer diameter, a lower female radial bearing constructed of a metal outer shell with a brazed carbide cloth lining that has been ground to a specified inner diameter, a thrust bearing assembly constructed of a series of grooved races with hardened steel bearings therebetween (quantity dependent on the maximum weight that will be applied during drilling for a given size of motor), an upper female radial bearing having the same construction as the lower female radial bearing, and an upper male radial bearing having the same construction as the lower male radial bearing.

The mud lube bearing pack is robust and able to withstand extreme drilling conditions, high bottom-hole temperatures, and highly abrasive environments, with high operating torques and high weight-on-bit loads. However, abrasive drilling fluids do wear mud lube bearings, triggering high manufacturing and maintenance costs. Moreover, because the bearing elements operate in abrasive drilling mud, rather than clean lubricating oil as is the case with sealed bearing pack designs, friction is increased, thereby reducing bearing life, reducing power received by the bit, and decreasing motor efficiency.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a method for lubricating a rotatable bearing assembly having a rotating output shaft extending therethrough, the output shaft operably coupled to a fluid motor powered by a stream of drilling fluid, the rotatable bearing assembly having an outer bearing housing extending from a lower end to an upper end, a lower radial bearing/seal assembly disposed coaxially adjacent to the lower end of the outer bearing housing, a thrust bearing assembly concentrically received within the lower end of the outer bearing housing, a pressure balance piston concentrically received within the outer bearing housing adjacent to the thrust bearing assembly, and an upper radial bearing assembly concentrically received within the upper end of the outer bearing housing, the method comprising: (a) initially operating in a first operational mode in which the thrust bearing assembly is fluidly isolated from the stream of the drilling fluid; and (b) after a failure of one or more of at least one sealing element of the lower radial bearing/seal assembly or at least one sealing element of the pressure balance piston, operating in a second operational mode in which the thrust bearing assembly is in fluid communication with the stream of the drilling fluid.

Another embodiment provides a lubricant and drilling-fluid cooled rotatable bearing assembly having a rotating output shaft extending therethrough, the rotating output shaft operably coupled with a fluid motor powered by a stream of drilling fluid. The rotatable bearing assembly may include: (1) a stationary outer bearing housing through which the output shaft extends; (2) a lower radial bearing/seal assembly coaxially disposed adjacent to a lower end of the outer bearing housing and through which the output shaft extends, the lower radial bearing/seal assembly comprising at least one lower sealing element and at least one pair of impinging lower radial bearing surfaces; (3) an upper radial bearing assembly concentrically disposed within an upper end of the outer bearing housing and through which the output shaft extends, the upper radial bearing assembly comprising at least one pair of impinging upper radial bearing surfaces; (4) a pressure balance piston disposed adjacent to the upper radial bearing assembly and through which the output shaft extends, the pressure balance piston comprising at least one upper sealing element; (5) a sealed bearing bore defined by the at least one lower sealing element, the at least one upper sealing element, and the outer bearing housing, the sealed bearing bore configured to receive a quantity of lubricant in an annular space between the outer bearing housing and the output shaft; and (6) a thrust bearing assembly disposed within the sealed bearing bore and through which the output shaft extends.

Yet another embodiment provides a rotatable bearing assembly for transferring a weight of a drill string to a rotating output shaft extending therethrough, the rotating output shaft rotated by a mud motor powered by a stream of drilling mud. The rotatable bearing assembly may include: (1) an outer bearing housing extending from a lower end to an opposing upper end; (2) an upper radial bearing assembly concentrically received within the upper end of the outer bearing housing and configured to provide an upper radial bearing between the outer bearing housing and the output shaft; (3) a pressure balance piston concentrically received within the outer bearing housing adjacent to the upper radial bearing assembly and configured to both fluidly seal the upper end of the outer bearing housing from an external environment and balance a pressure within an interior of the outer bearing housing and the external environment; (4) a lower radial bearing/seal assembly disposed coaxially adjacent to the lower end of the outer bearing housing and configured to fluidly seal the lower end of the outer bearing housing from the external environment, balance the pressure within the interior of the outer bearing housing and the external environment, and provide a lower radial bearing between the outer bearing housing and the output shaft; and (5) a thrust bearing assembly concentrically received within the interior of the outer bearing housing, wherein: (a) when in a first configuration, the interior of the outer bearing housing is fluidly isolated from the external environment; and (b) when in a second configuration, the interior of the outer bearing housing is in fluid communication with the external environment such that the stream of the drilling mud enters the interior of the outer bearing housing.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 2A-2B illustrate respective side-plan and cross-sectional views of the bearing pack assembly of FIG. 1;

FIGS. 3A-3B illustrate respective perspective and side-plan views of one embodiment of a thrust bearing assembly for concentric assembly into the bearing pack assembly of FIG. 1;

FIGS. 4A-4B illustrate respective perspective and side-plan views of a fluid motor output shaft that extends through the bearing pack assembly and the thrust bearing assembly of FIGS. 1, 2A-2B, and 3A-3B;

FIGS. 5A-5B illustrate respective side-plan and cross-sectional views of one embodiment of a lower male radial bearing/seal sleeve of the bearing pack assembly of FIG. 1;

FIGS. 6A-6C illustrate respective perspective, side-plan, and cross-sectional views of one embodiment of a lower female radial bearing/seal housing of the bearing pack assembly of FIG. 1;

FIGS. 7A-7C illustrate respective front-plan, cross-sectional, and side-plan views of one embodiment of a lower retaining nut of the bearing pack assembly of FIG. 1;

FIGS. 9A-9B illustrate respective side-plan and cross-sectional views of one embodiment of an outer bearing housing of the bearing pack assembly of FIG. 1;

FIGS. 10A-10C illustrate respective perspective, side-plan, and cross-sectional views of one embodiment of a pressure balance piston of the bearing pack assembly of FIG. 1, for balancing an interior pressure of the sealed interior of the outer bearing housing of FIGS. 9A-9B with an exterior pressure in the wellbore;

FIGS. 11A-11C illustrate respective perspective, side-plan, and cross-sectional views of one embodiment of an upper female radial bearing of the bearing pack assembly of FIG. 1;

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to rotatable bearing assemblies for use in downhole mud motor assemblies in the oil and gas, mining, and other industries. More specifically, this description discusses embodiments of a bearing pack assembly and a thrust bearing assembly configured for dual-mode operation in a first sealed operational mode and a second mud lube operational mode. Embodiments of the described bearing pack assembly provide the benefit of a sealed, oil lubricated environment for increased efficiency and life of the thrust bearing assembly contained therein, as well as the robust ability of a mud lube bearing pack to withstand the harsh environment created by the wellbore fluid and downhole temperatures in the event of a seal failure.

Figure 1:
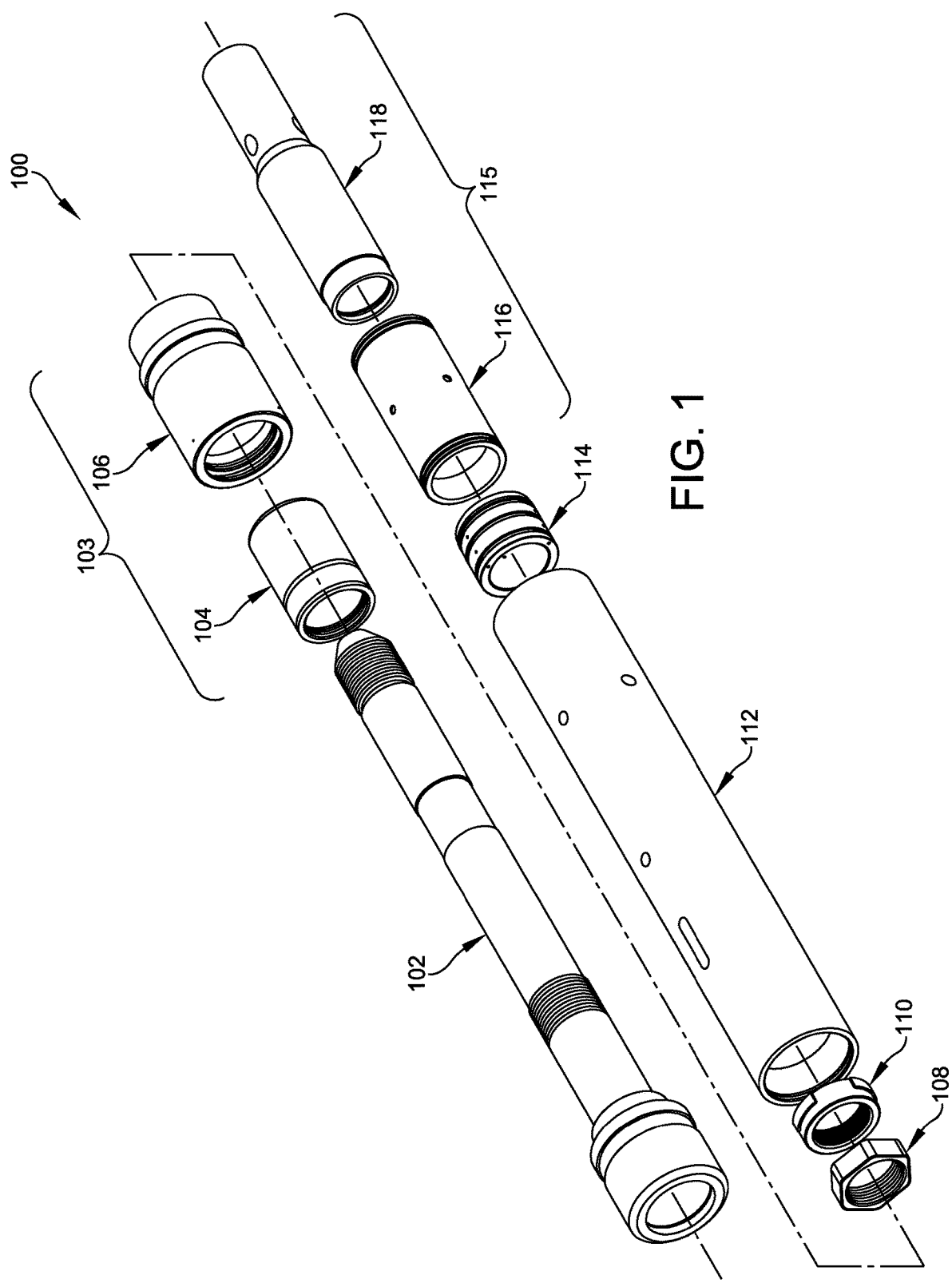
FIG. 1 illustrates an exploded-perspective view of one embodiment of a bearing pack assembly configured for dual-mode operation in a first sealed operational mode and a second mud lube operational mode.

Turning to the exemplary embodiments, FIGS. 1 and 2A-2B illustrate respective exploded-perspective, side-plan, and cross-sectional views of one embodiment of a bearing pack assembly 100. In this embodiment, the bearing pack assembly 100 includes a number of concentrically nested components having a rotating output shaft 102 extending therethrough. The output shaft 102 and each of the components of the bearing back assembly 100 are detailed below with reference to FIGS. 4-12, including a lower radial bearing/seal assembly 103 having a lower male radial bearing/seal sleeve 104 and a lower female radial bearing/seal housing 106, a lower retaining nut, an anti-fish retainer 110, an outer bearing housing 112, a pressure balance piston 114, and an upper radial bearing assembly 115 having an upper female radial bearing 116 and an upper male radial bearing 118. FIGS. 3A-3B illustrate respective perspective and side-plan views of a thrust bearing assembly 300 for enclosure within the outer bearing housing 110 of the bearing pack assembly 100, as detailed further below.

Turning to the various components of the bearing pack assembly 100, FIGS. 4A-4B illustrate respective perspective and side-plan views of one embodiment of the output shaft 102. In this embodiment, the output shaft 102 may include a first (lower) end 120 extending to a second opposing (upper) end 122 with several sections extending therebetween, including an American Petroleum Institute (API) connection 124 at the first end 120, a first diameter section 126 having a first diameter 128, a second diameter section 130 having a second diameter 132, a first threaded section 134, a third diameter section 136 having a third diameter 138, a fourth diameter section 140 having a fourth diameter 142, a fifth diameter section 144 having a fifth diameter 146 equal to the third diameter 138, a second threaded section 148, and an angular shoulder 150 located at the second (upper) end 122. The output shaft 102 may also include an interior bore 152 traversing axially between the first and the second ends 120, 122 of the output shaft 102.

FIGS. 5A-5B illustrate side-plan and cross-sectional views, respectively, of one embodiment of the lower male radial bearing/seal sleeve 104 configured to be inserted about the second diameter section 130 of the output shaft 102. In this embodiment, the lower male radial bearing/seal sleeve 104 may include an inner shell 153 that extends from a first (lower) end 154 to an opposing second (upper) end 156. An exterior chrome overlaid section 160 (e.g., a sprayed carbide coating) may be disposed adjacent to the first end 154, and an exterior brazed carbide cloth overlaid section 162 may be disposed adjacent to the second end 156 of the inner shell 153 and act as a radial bearing surface against the lower female radial bearing/seal housing 106, discussed further below. Both the chrome overlaid section 160 and the brazed carbide cloth overlaid section 162 may be ground to an outer diameter 158.

The inner shell 153 of the lower male radial bearing/seal sleeve 104 may also feature an inner diameter 164 having two interior O-ring grooves 166 formed adjacent to each of the first and the second ends 154, 156 and configured to receive appropriate O-rings to be disposed about the second diameter section 130 of the output shaft 102.

Figure 6C:
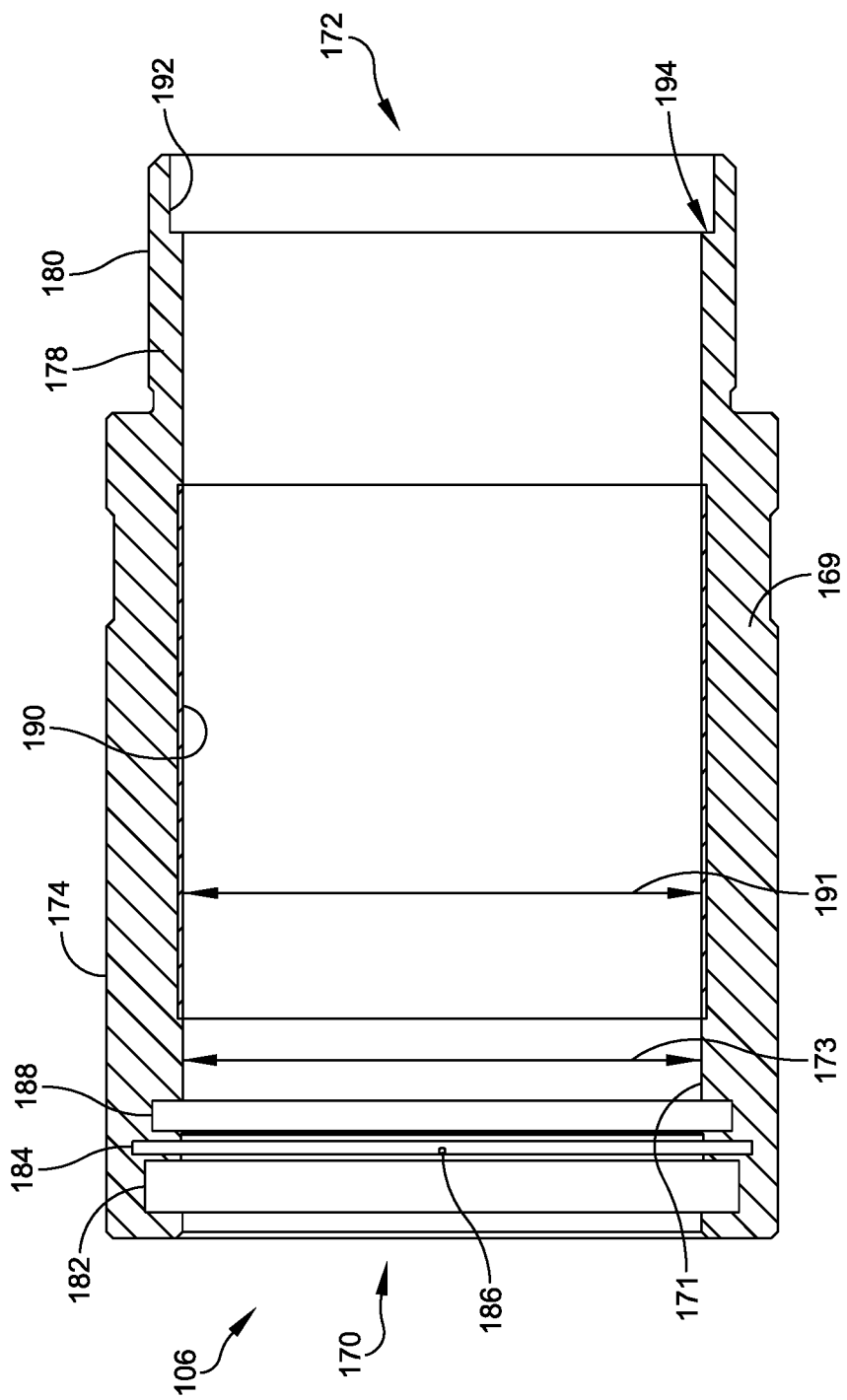

FIGS. 6A-6C illustrate respective perspective, side-plan, and cross-sectional views of one embodiment of the lower female radial bearing/seal housing 106. In this embodiment, the lower female radial bearing/seal housing 106 may include an outer metal housing 169 that extends from a first (lower) end 170 to a second (upper) opposing end 172, with several exterior and interior sections disposed therebetween. A first exterior section 174 disposed adjacent to the first end 170 may form a first outer diameter 176, and a second exterior section 178 disposed adjacent the second end 172 may form a male threaded connection 180.

Progressing from the first end 170 to the second end 172 of the lower female radial bearing/seal housing 106, the interior sections may form a Polypak® seal groove 182, a pressure balancing O-ring groove 184 having a plurality of pressure-balancing vent holes 186 drilled radially therethrough to the first exterior section 174, a Kalsi seal groove 188, a sprayed carbide coating section 171 ground to a specified inner diameter 173, a brazed carbide cloth section 190 ground to a specified inner diameter 191 and acting as a radial bearing surface against the brazed carbide cloth overlaid section 162 of the lower male radial bearing/seal sleeve 104 nested therein, and a larger inner diameter section 192 disposed adjacent to the second end 172 and forming a shoulder 194 that acts as a catch surface for the anti-fish retainer 110, detailed below.

When assembled into the lower radial bearing/seal assembly 103 (FIG. 1), the lower male radial bearing/seal sleeve 104 and the lower female radial bearing/seal housing 106 provide both a radial bearing between the outer bearing housing 112 (FIGS. 9A-9B) and the output shaft 102 and a sealing mechanism between the drilling fluid/external environment of the wellbore and the lower end of the outer bearing housing 112, forming an interior of the housing 112 within which the thrust bearing assembly 300 operates, as discussed further below.

Figure 7C:
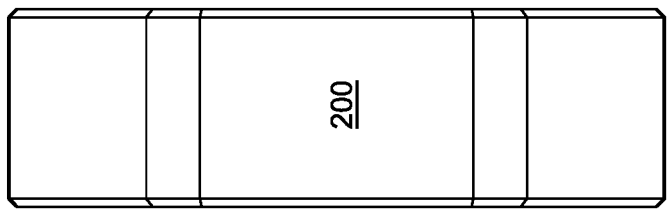

FIGS. 7A-7C illustrate front-plan, cross-sectional, and side-plan views, respectively, of one embodiment of the lower retaining nut 108. In this embodiment, the lower retaining nut 108 may be formed of a metal ring 198 having six equal machined flat surfaces 200 disposed about an outer periphery of the ring 198, thereby creating a hexagonal shape. The lower retaining nut 108 may also include a female left-hand threaded connection 196 machined into an inner diameter 197 of the metal ring 198 and configured to threadably receive the first threaded section 134 of the output shaft 102 to retain the lower male radial bearing/seal sleeve 104 about the second diameter section 130, having the second diameter 132, of the output shaft 102, as shown in FIG. 2B.

Figure 8B:
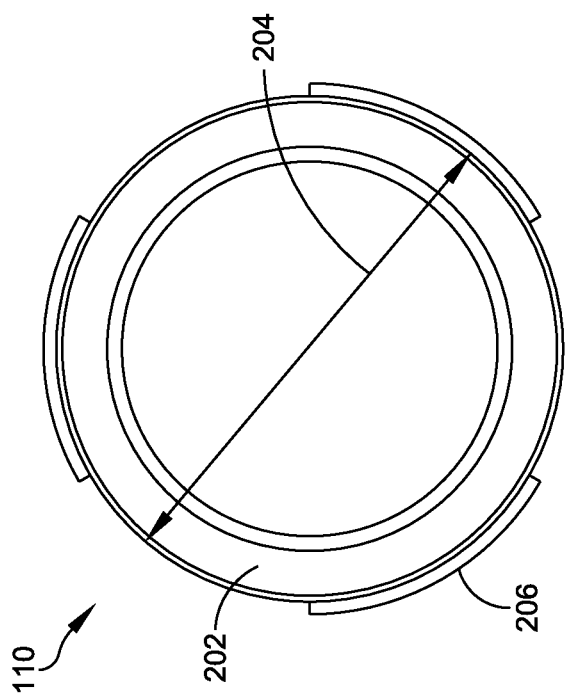
FIGS. 8A-8B illustrate respective perspective and front-plan views of one embodiment of an anti-fish retainer of the bearing pack assembly of FIG. 1.
Figure 8A:
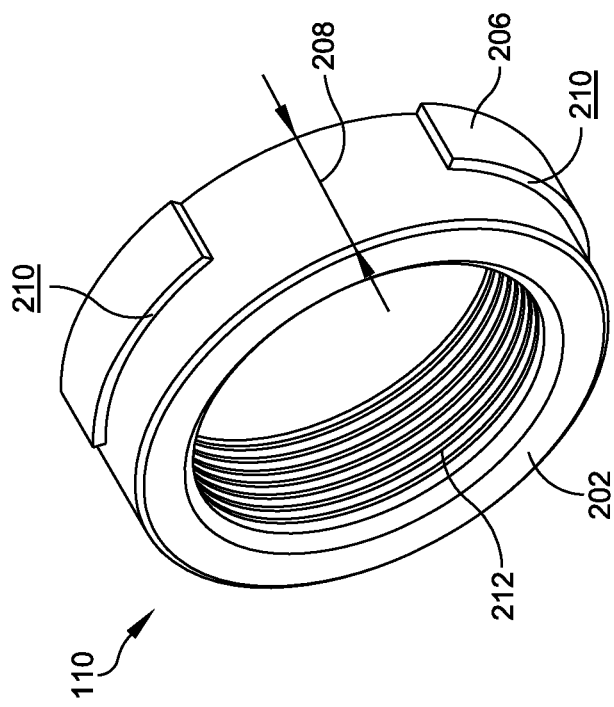

FIGS. 8A-8B illustrate respective perspective and front-plan views of one embodiment of the anti-fish retainer 110. In this embodiment, the anti-fish retainer 110 may include a metal ring 202 having an outer diameter 204, with three larger-diameter segments 206 extending radially from the outer diameter 204 at equal intervals about a periphery of the metal ring 202, where each of the three larger-diameter segments 206 extend along 60 degrees circumferentially and extend along half of an axial length 208 of the anti-fish retainer 110. The larger-diameter segments 206 may each form a catch surface 210 that engages with the shoulder 194 of the lower female radial bearing/seal housing 106, acting as a catch device that enables the motor to be successfully removed from the wellbore as a complete assembly should any portion of the output shaft 102 fail. In this embodiment, the anti-fish nut 110 may also include a female connection 212 machined into an inner diameter of the metal ring 202, which is configured to be threadably received by the first threaded section 134 of the output shaft 102 to lock the lower retaining nut 108 into place in the position discussed above.

FIGS. 9A-9B illustrate respective side-plan and cross-sectional views of one embodiment of the outer bearing housing 112. The outer bearing housing may include a metal outer shell 214 having an outer diameter 215 and extending from a first (lower) end 216 to an opposing second (upper) end 218 with several interior sections disposed therebetween. Progressing from the first end 216 to the second end 218, the interior sections may include a female threaded connection 220, a thrust bearing bore 222 that encloses the thrust bearing assembly 300, a shoulder 224 that acts or bears upon the thrust bearing assembly 300 during operation of the mud motor, a bypass chamber 226 for the pressure balance piston 114, a pressure piston bore 228 that acts as the operating bore area for the pressure balance piston 114, a bearing chamber 230 having an inner diameter 232 configured to receive the upper female radial bearing 116, and a female right-hand threaded connection 233.

At least four counterbores 236 and corresponding threaded holes 234 may be drilled radially at 90 degree intervals about the bearing chamber 230 into the interior of the outer bearing housing 112. The threaded holes 234 may receive appropriate set screws (not shown) for retaining the upper female radial bearing 116 within the outer bearing housing 112, as discussed below. The outer bearing housing 114 may also include a single threaded port 238 machined into the pressure piston bypass chamber 226 for filing the sealed interior of the outer bearing housing 112 with lubricant (e.g., a petroleum-based lubricant).

FIGS. 10A-10C illustrate respective perspective, side-plan, and cross-sectional views of one embodiment of the pressure balance piston 114 for balancing an interior pressure of the sealed interior of the outer bearing housing 112 with an exterior pressure in the wellbore. In this embodiment, the pressure balance piston 114 may be formed of a metal cylinder body 240 having an outer diameter 241 and extending from a first (lower) end 242 to an opposing second (upper) end 244 with several external and internal sections disposed therebetween. Three O-ring grooves 246 may be formed in the outer diameter 241 such that O-rings (not shown) disposed in the O-ring grooves may act as both sealing and anti-rotation devices against the outer bearing housing 112.

Progressing from the first end 242 to the second end 244 of the pressure balance piston 114, the interior sections may include a first inner section 248 disposed adjacent to the first end 242, or toward the lower, lubricant side of the piston 114, having an inner diameter 250 that receives a sliding bearing (e.g., a DU® sliding bearing) having an outer shell and a Teflon® inner lining (not shown). The next internal sections may comprise a Kalsi seal groove 252, a pressure balancing O-ring groove 254 having a pressure relief hole 256 drilled through the body of the piston 114 to the environment side of the piston 114 to balance the pressure between the Kalsi seal and a wiper seal, and a wiper seal groove 258 configured to receive a wiper seal (not shown).

A series of three pairs of pressure balancing holes 260, spaced at 120 degree intervals radially, may be drilled radially through the body 240 of the piston 114 and between the exterior O-ring grooves 246. The pressure relief holes 260 may act as pressure balancing vents. In addition, a series of three holes 262 may be drilled from the first or lubricant side 242 of the cylinder 240 toward the second side 244 to intersect with the three radially drilled holes 260 acting as pressure balancing vents.

FIGS. 11A-11C illustrate respective perspective, side-plan, and cross-sectional views of one embodiment of the upper female radial bearing 116. In this embodiment, the upper female radial bearing 116 may include an outer metal shell 263 extending from a first (lower) end 264 to an opposing second (upper) end 266 and having an outer diameter 268. A series of four exterior O-ring grooves 270, two each disposed at each of the first and the second ends 264, 266 of the outer shell 263, may receive O-rings that seal the outer diameter 268 against the outer bearing housing 112, as shown in FIG. 2B. Four counterbores 272 may be situated at 90 degree intervals about a periphery of the outer shell 263. The counterbores 272 may coincide with the four threaded holes 234 situated radially about the bearing chamber 230 of the outer bearing housing 112 and receive the set screws to retain the upper female radial bearing 116 in place within the bearing chamber 230. An interior 273 of the shell 263 may include a brazed carbide cloth coating ground to an inner diameter 274 that acts as a radial bearing surface against the upper male radial bearing 118 when received within the bearing chamber 230 of the outer bearing housing 112, above the bypass chamber 226, as shown in FIG. 2B.

Figure 12A:
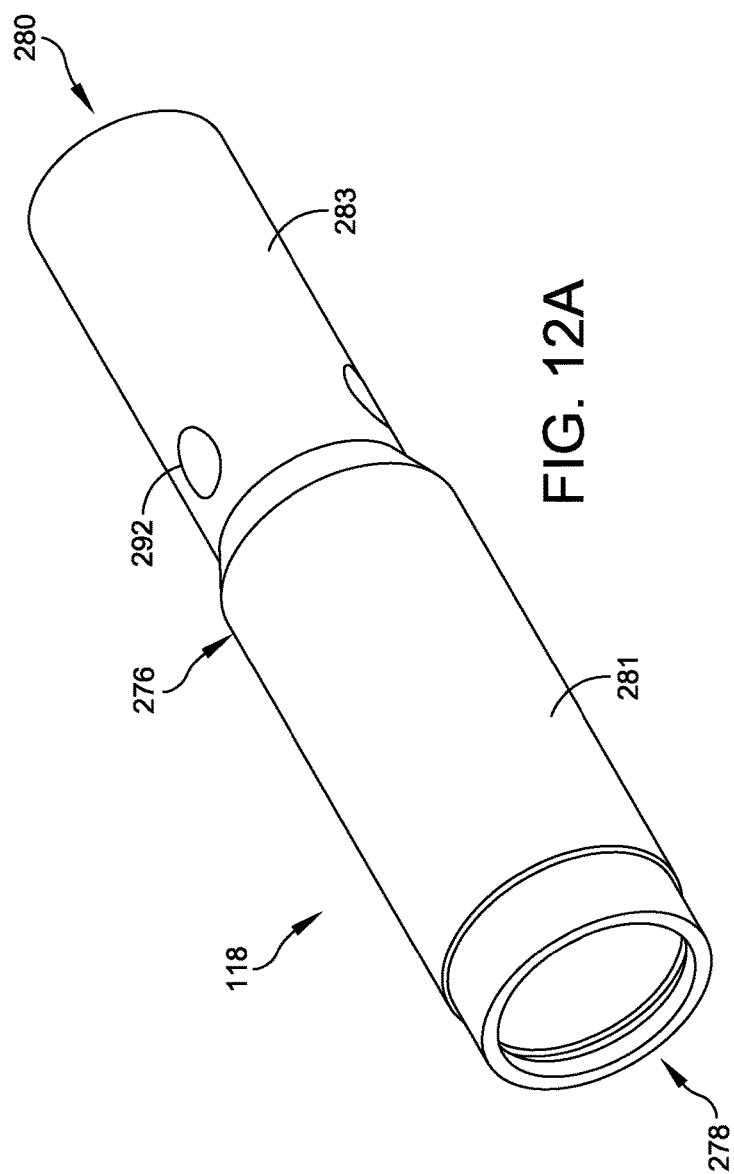
FIGS. 12A-12C illustrate respective perspective, side-plan, and cross-sectional views of one embodiment of an upper male radial bearing of the bearing pack assembly of FIG. 1.
Figure 12B:
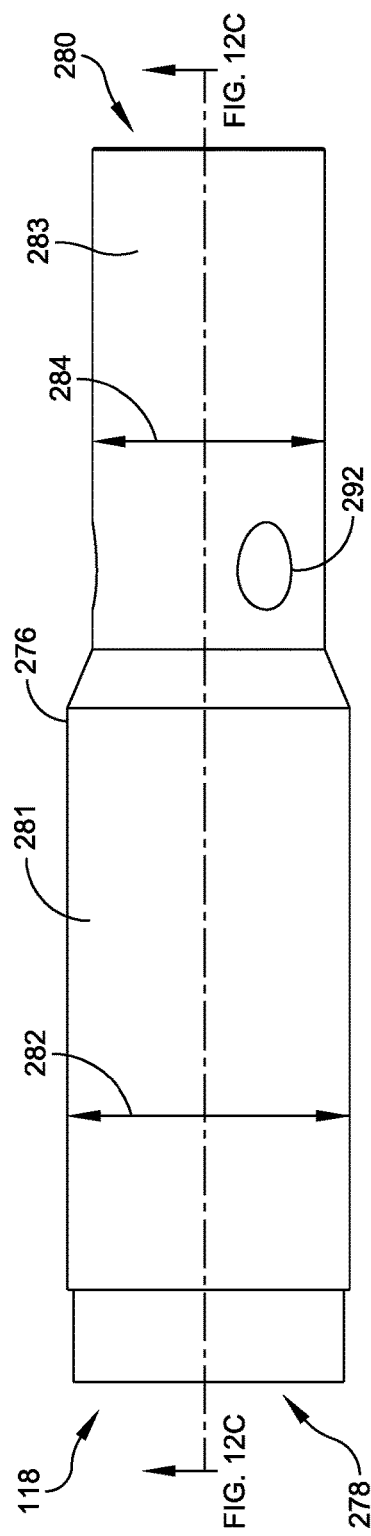
Figure 12C:
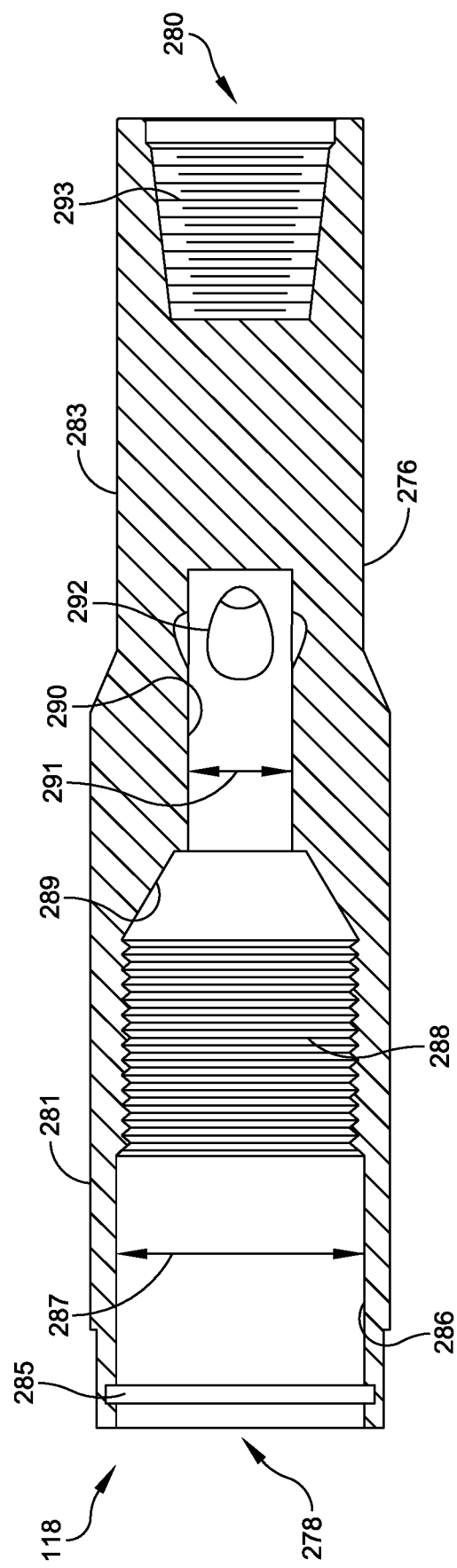

FIGS. 12A-12C illustrate respective perspective, side-plan, and cross-sectional views of one embodiment of the upper male radial bearing 118. In this embodiment, the upper male radial bearing 118 may include a metal cylindrical body 276 extending from a first (lower) end 278 to an opposing second (upper) end 280 with a plurality of exterior and interior sections disposed therebetween. Progressing from the first end 278 to the second end 280, a first exterior section 281 may include a brazed carbide cloth coating ground to a first outer diameter 282 and configured to act as a radial bearing surface against the inner diameter 274 of the upper female radial bearing 116. The first exterior section 281 may taper to a second exterior section 283 having a second outer diameter 284.

Also progressing from the first end 278 to the second end 280, the interior sections may include an O-ring groove 285 configured to receive an appropriate O-ring to seal against the output shaft 102 and prevent drilling fluid intrusion into the internal threaded connection with the output shaft 102, a first interior section 286 having a first inner diameter 287 and a second interior threaded section 288, both within the first exterior section 281, an angular shoulder 289 tapering a third interior section 290 having a second inner diameter 291, which extends axially from within the first exterior section 281 to within the second exterior section 283.

Three circular ports 292 may be drilled at an angle radially from the second exterior section 283 into the third interior section 290 to bypass drilling fluid into the interior bore 152 of the output shaft 102. Adjacent to the second (upper) end 280, the final interior section may be a threaded female connection 293 within the second exterior section 283. In operation, the upper female radial bearing 116 and upper male radial bearing 118 assemble into the upper radial bearing assembly 115, which provides an upper radial bearing between the outer bearing housing 112 and the output shaft 102 that is lubricated by drilling fluid.

Returning to FIGS. 3A-3B, which detail the thrust bearing assembly 300 for placement within the bearing bore 222 of the outer bearing housing 112, about the periphery of the output shaft 102, thrust assembly 300 may include a series of hardened, grooved bearing races having hardened steel bearings placed within the grooved races. Specifically, the series of bearing races may include two single groove bearing races 302, one disposed at each of the lower and upper ends of the series, and nine dual row bearing races 304, with a plurality of hardened rock bit balls 306 disposed in the grooves of the races 302, 304. The thrust bearing assembly 300 has an inner diameter 308 that may be disposed about the output shaft 102 and an outer diameter 310 that may be received within the bearing bore 222 of the outer bearing housing such that the rock bit balls 302 act as thrust bearings about shaft 102.

Figure 13:
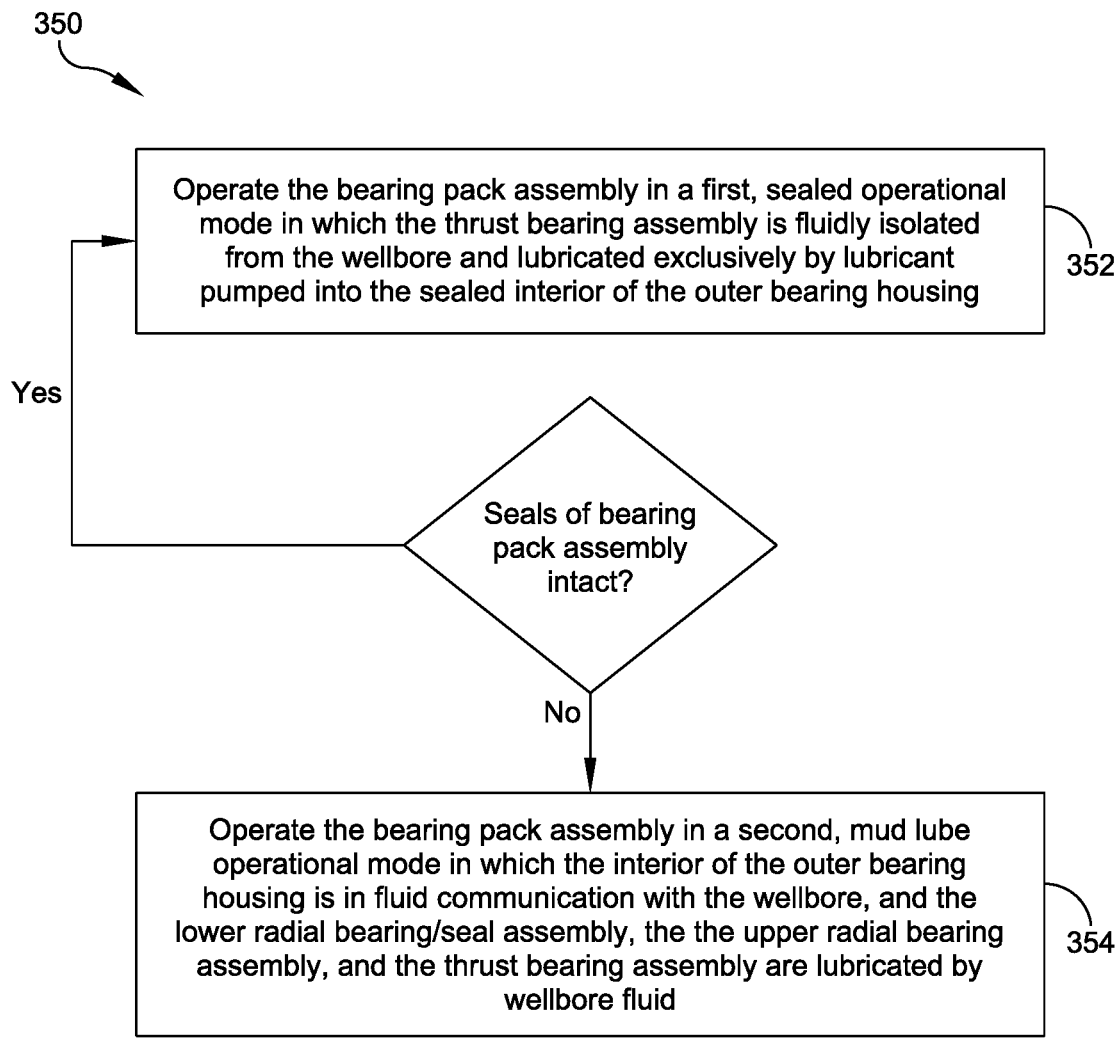
FIG. 13 provides a flowchart depicting an exemplary dual-mode operational method for cooling and lubricating a rotatable bearing assembly such as the bearing pack assembly of FIG. 1 housing the thrust bearing assembly of FIG. 3, having the output shaft of FIGS. 4A-4B extending therethrough.

FIG. 13 provides a flowchart depicting an exemplary dual-mode operational method (350) for cooling and lubricating a rotatable bearing assembly, such as the bearing pack assembly 100 housing the thrust bearing assembly 300, having an output shaft extending therethrough. In this embodiment, the method (350) may involve initially operating in a first, sealed operational mode (352) in which the thrust bearing assembly 300 is fluidly isolated from the drilling fluid by seals/O-rings disposed within the grooves 166, 182, 184, 188 of the lower radial bearing/seal assembly 103, within the grooves 246, 252, 254, 258 of the pressure balance piston 114, and within the grooves 270 of the upper radial bearing assembly 115. In this first, sealed operational mode, the interior of the outer bearing housing 112 may be filled with a petroleum-based lubricant that exclusively cools and lubricates the thrust bearing assembly 300. After one or more of the seals fail, the method continues with a second, unsealed operational mode (354) in which the drilling fluid may fluidly communicate between an exterior of the bearing pack assembly 100 and the interior of the outer bearing housing 112. In this second, unsealed operational mode, the lubricant may be lost, and via the same fluid pathways, the radial bearing provided by the lower radial bearing/seal assembly 103, the thrust bearing assembly 300, and the radial bearing provided by the upper radial bearing assembly 115 may be cooled and lubricated by the drilling fluid.

Embodiments of the systems and methods discussed above utilize sealed bearing pack technologies that are uniquely integrated with mud lubed bearing pack technologies to provide an oil lubricated environment, which increases the longevity of the thrust bearing assembly, and also provide a robust ability for the bearing pack assembly to withstand the harsh wellbore environment that presents abrasive wellbore fluid and high temperatures in the event the sealed lubricant is lost due to one or more compromised seals or seal failures. As a result, the described bearing pack assembly may operate in two modes: (1) a sealed, lubricated operational mode in which the thrust bearing assembly 300 is isolated in a sealed, pressure-balanced, and lubricated chamber; and (2) upon a failure of the sealing components, a mud lube operational mode in which the upper female and male radial bearings 116, 118 and the lower female radial bearing/seal housing 106 and male seal/radial bearing sleeve 104, in conjunction with the thrust bearing assembly 300, operate while lubricated by drilling fluid or mud.

Components of the bearing pack assembly 100 and/or the thrust bearing assembly 300 may be formed of any appropriate corrosion and abrasion-resistant, high temperature tolerant, and high torsion strength material or combination of materials. In one embodiment, components may be formed of 17-4 stainless steel treated to a PH900 condition after machining or may be formed of 4145HT alloy steel, 4330V MOD, and/or 4130HT steel alloy. Embodiments of the pressure balance piston 114 may be formed from C863 manganese bronze. Embodiments of the output shaft 102 and the upper male radial bearing 118 may be either machined from billet or closed die forged to near net. All remaining components may be machined from billet. Appropriate and commercially available O-rings and other seals of any appropriate size, shape, type, and/or configuration may be assembled into the appropriate grooves to provide the described sealing.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method for lubricating a rotatable bearing assembly having a rotating output shaft extending therethrough, the output shaft operably coupled to a fluid motor powered by a stream of drilling fluid, the rotatable bearing assembly having an outer bearing housing extending from a lower end to an upper end, a lower radial bearing/seal assembly disposed coaxially adjacent to the lower end of the outer bearing housing, a thrust bearing assembly concentrically received within the lower end of the outer bearing housing, a pressure balance piston concentrically received within the outer bearing housing adjacent to the thrust bearing assembly, and an upper radial bearing assembly concentrically received within the upper end of the outer bearing housing, the method comprising:
   initially operating in a first operational mode in which the thrust bearing assembly is fluidly isolated from the stream of the drilling fluid; and
   after a failure of one or more of at least one sealing element of the lower radial bearing/seal assembly or at least one sealing element of the pressure balance piston, operating in a second operational mode in which the thrust bearing assembly is in fluid communication with the stream of the drilling fluid.

2. The method of claim 1, wherein the initially operating in the first operational mode comprises:
   isolating the thrust bearing assembly from the stream of the drilling fluid via the at least one sealing element of the lower radial bearing/seal assembly and the at least one sealing element of the pressure balance piston;
   filling an interior of the outer bearing housing with a quantity of lubricant; and
   operating the rotatable bearing assembly such that at least the thrust bearing assembly is exclusively lubricated by the quantity of the lubricant within the interior of the outer bearing housing and at least the upper radial bearing assembly is exclusively lubricated by the stream of the drilling fluid.

3. The method of claim 2, wherein the operating in the second operational mode comprises:
   via a failure of the at least one sealing element of the lower radial bearing/seal assembly or the at least one sealing element of the pressure balance piston, introducing the stream of the drilling fluid to the thrust bearing assembly within the interior of the outer bearing housing; and
   operating the rotatable bearing assembly such that the lower radial bearing/seal assembly, the thrust bearing assembly, and the upper radial bearing assembly are exclusively lubricated by the stream of the drilling fluid.

4. The method of claim 3, wherein the lower radial bearing/seal assembly comprises:
  a lower male radial bearing/seal sleeve disposed about the output shaft and having at least one exterior bearing surface and at least one interior seal groove; and
  a lower female radial bearing/seal housing disposed about the lower male radial bearing/seal sleeve and having at least one interior bearing surface and at least one interior seal groove, wherein:
  the at least one exterior bearing surface of the lower male radial bearing/seal sleeve and the at least one interior bearing surface of the lower female radial bearing/seal housing form a lower radial bearing;
  during the operating in the first operational mode, the lower radial bearing is lubricated by the quantity of the lubricant within the interior of the outer bearing housing; and
  during the operating in the second operational mode, the lower radial bearing is lubricated by the stream of the drilling fluid.

5. The method of claim 3, wherein the upper radial bearing assembly comprises:
  an upper male radial bearing disposed about the output shaft and having at least one exterior bearing surface; and
  an upper female radial bearing disposed about the upper male radial bearing and having at least one interior bearing surface, wherein:
    the at least one exterior bearing surface of the upper male radial bearing and the at least one interior bearing surface of the upper female radial bearing form an upper radial bearing; and
    during the operating in the first and the second operational modes, the upper radial bearing is lubricated by the stream of the drilling fluid.

6. The method of claim 1, wherein the pressure balance piston comprises a cylindrical body having an exterior and a hollow interior, the exterior forming one or more exterior seal grooves for sealing against the outer bearing housing, the hollow interior forming one or more interior seal grooves for sealing against the output shaft and balancing a pressure within an interior of the outer bearing housing, and the cylindrical body having one or more pressure relief holes extending from the hollow interior to the exterior of the cylindrical body.

7. The method of claim 1, wherein the rotatable bearing assembly further comprises an anti-fish retainer disposed between the lower radial bearing/seal assembly and the thrust bearing assembly, the anti-fish retainer forming a catch surface configured to engage with the lower radial bearing/seal assembly such that when the output shaft moves in an upward direction toward the upper end of the outer bearing housing, an entirety of the rotatable bearing assembly moves with the output shaft in the upward direction.

8. A lubricant and drilling-fluid cooled rotatable bearing assembly having a rotating output shaft extending therethrough, the rotating output shaft operably coupled with a fluid motor powered by a stream of drilling fluid, the rotatable bearing assembly comprising:
  a stationary outer bearing housing through which the output shaft extends;
  a lower radial bearing/seal assembly coaxially disposed adjacent to a lower end of the outer bearing housing and through which the output shaft extends, the lower radial bearing/seal assembly comprising at least one lower sealing element and at least one pair of impinging lower radial bearing surfaces;
  an upper radial bearing assembly concentrically disposed within an upper end of the outer bearing housing and through which the output shaft extends, the upper radial bearing assembly comprising at least one pair of impinging upper radial bearing surfaces;
  a pressure balance piston disposed adjacent to the upper radial bearing assembly and through which the output shaft extends, the pressure balance piston comprising at least one upper sealing element;
  a sealed bearing bore defined by the at least one lower sealing element, the at least one upper sealing element, and the outer bearing housing, the sealed bearing bore configured to receive a quantity of lubricant in an annular space between the outer bearing housing and the output shaft; and
  a thrust bearing assembly disposed within the sealed bearing bore and through which the output shaft extends.

9. The lubricant and drilling-fluid cooled rotatable bearing assembly of claim 8, wherein the lower radial bearing/seal assembly comprises:
  a lower male radial bearing/seal sleeve disposed about the output shaft and having at least one exterior bearing surface and at least one interior seal groove; and
  a lower female radial bearing/seal housing disposed about the lower male radial bearing/seal sleeve and having at least one interior bearing surface and at least one interior seal groove, wherein:
  the at least one exterior bearing surface of the lower male radial bearing/seal sleeve and the at least one interior bearing surface of the lower female radial bearing/seal housing form the at least one pair of impinging lower radial bearing surfaces; and
  the at least one interior seal groove of the lower male radial bearing/seal sleeve and the at least one interior seal groove of the lower female radial bearing/seal housing form the at least one lower sealing element defining the sealed bearing bore.

10. The lubricant and drilling-fluid cooled rotatable bearing assembly of claim 9, wherein the upper radial bearing assembly comprises:
  an upper male radial bearing disposed about the output shaft and having at least one exterior bearing surface; and
  an upper female radial bearing disposed about the upper male radial bearing and having at least one interior bearing surface, wherein:
    the at least one exterior bearing surface of the upper male radial bearing and the at least one interior bearing surface of the upper female radial bearing form the at least one pair of the impinging upper radial bearing surfaces.

11. The lubricant and drilling-fluid cooled rotatable bearing assembly of claim 8, wherein the pressure balance piston is configured to balance an internal pressure within the sealed bearing bore and an external pressure of a wellbore containing the rotatable bearing assembly.

12. The lubricant and drilling-fluid cooled rotatable bearing assembly of claim 8, further comprising an anti-fish retainer disposed between the lower radial bearing/seal assembly and the thrust bearing assembly and through which the output shaft extends, the anti-fish retainer forming a catch surface configured to engage with the lower radial bearing/seal assembly such that when the output shaft moves in an upward direction toward the upper end of the outer bearing housing, an entirety of the rotatable bearing assembly moves with the output shaft in the upward direction.

13. A rotatable bearing assembly for transferring a weight of a drill string to a rotating output shaft extending therethrough, the rotating output shaft rotated by a mud motor powered by a stream of drilling mud, comprising:
an outer bearing housing extending from a lower end to an opposing upper end;
an upper radial bearing assembly concentrically received within the upper end of the outer bearing housing and configured to provide an upper radial bearing between the outer bearing housing and the output shaft;
a pressure balance piston concentrically received within the outer bearing housing adjacent to the upper radial bearing assembly and configured to both fluidly seal the upper end of the outer bearing housing from an external environment and balance a pressure within an interior of the outer bearing housing and the external environment;
a lower radial bearing/seal assembly disposed coaxially adjacent to the lower end of the outer bearing housing and configured to fluidly seal the lower end of the outer bearing housing from the external environment, balance the pressure within the interior of the outer bearing housing and the external environment, and provide a lower radial bearing between the outer bearing housing and the output shaft; and
a thrust bearing assembly concentrically received within the interior of the outer bearing housing, wherein:
when in a first configuration, the interior of the outer bearing housing is fluidly isolated from the external environment; and
when in a second configuration, the interior of the outer bearing housing is in fluid communication with the external environment such that the stream of the drilling mud enters the interior of the outer bearing housing.

14. The rotatable bearing assembly of claim 13, wherein:
the lower radial bearing/seal assembly comprises one or more lower seal grooves for fluidly sealing the lower end of the outer bearing housing from the external environment when in the first configuration and for fluidly connecting the lower end of the outer bearing housing from the external environment when in the second configuration; and
the pressure balance piston comprises one or more upper seal grooves for fluidly sealing the upper end of the outer bearing housing from the external environment when in the first configuration and for fluidly connecting the upper end of the outer bearing housing from the external environment when in the second configuration.

15. The rotatable bearing assembly of claim 13, wherein:
the lower radial bearing/seal assembly comprises a plurality of lower seal grooves, each in receipt of a lower seal configured to seal the lower end of the outer bearing housing; and
the pressure balance piston comprises a plurality of upper seal grooves, each in receipt of an upper seal configured to seal the upper end of the outer bearing housing.

16. The rotatable bearing assembly of claim 15, wherein when in the first configuration, each of the lower seals and each of the upper seals is intact.

17. The rotatable bearing assembly of claim 16, wherein when in the second configuration, one or more of the lower seals or one or more of the upper seals is compromised.

18. The rotatable bearing assembly of claim 13, wherein the lower radial bearing/seal assembly comprises:
a lower male radial bearing/seal sleeve through which the output shaft extends, the lower male radial bearing/seal sleeve forming an exterior having at least one exterior radial bearing surface and a hollow interior forming at least one interior seal groove for sealing against the output shaft; and
a lower female radial bearing/seal housing disposed about the lower male radial bearing/seal sleeve and forming an exterior and a hollow interior having at least one interior radial bearing surface impinging on the at least one exterior radial bearing surface of the lower male radial bearing/seal sleeve and at least one interior seal groove for sealing against the exterior of the lower male radial bearing/seal sleeve.

19. The rotatable bearing assembly of claim 18, wherein the upper radial bearing assembly comprises:
an upper male radial bearing through which the output shaft extends and forming an exterior, an interior bore concentrically receiving the output shaft, and at least one exterior radial bearing surface; and
an upper female radial bearing disposed about the upper male radial bearing and forming an exterior having one or more exterior seal grooves for sealing against the outer bearing housing and a hollow interior having at least one interior radial bearing surface impinging on the at least one exterior radial bearing surface of the upper male radial bearing.

20. The rotatable bearing assembly of claim 13, further comprising an anti-fish retainer disposed between the lower radial bearing/seal assembly and the thrust bearing assembly and through which the output shaft extends, the anti-fish retainer forming a catch surface configured to engage with the lower radial bearing/seal assembly such that when the output shaft moves in an upward direction toward the upper end of the outer bearing housing, an entirety of the rotatable bearing assembly moves with the output shaft in the upward direction.

* * * * *